United States Patent [19]
Peart et al.

[11] 3,918,436
[45] Nov. 11, 1975

[54] BLOOD PRESSURE MEASURING SYSTEM

[75] Inventors: Edward Lynn Peart, Arden; Billy Otis Martin, Asheville, both of N.C.

[73] Assignee: Sybron Corporation, Rochester, N.Y.

[22] Filed: Apr. 19, 1974

[21] Appl. No.: 462,519

[52] U.S. Cl. .................. 128/2.05 G; 128/2.05 M
[51] Int. Cl.² .............................. A61B 5/02
[58] Field of Search.... 128/2.05 G, 2.05 M, 2.05 A, 128/2.05 Q

[56] References Cited
UNITED STATES PATENTS

| | | | |
|---|---|---|---|
| 2,149,690 | 3/1939 | Snyder | 128/2.05 M |
| 2,660,164 | 11/1953 | Hasbrouck | 128/2.05 Q |
| 2,811,964 | 11/1957 | Boucke | 128/2.05 G |
| 3,056,401 | 10/1962 | Greenspen et al. | 128/2.05 G |
| 3,117,570 | 1/1964 | Halasz et al. | 128/2.05 M |
| 3,662,394 | 5/1972 | Dudler | 128/2.05 G |

FOREIGN PATENTS OR APPLICATIONS

| | | | |
|---|---|---|---|
| 135,581 | 7/1960 | U.S.S.R. | 128/2.05 G |
| 978,074 | 12/1964 | United Kingdom | 128/2.05 M |

*Primary Examiner*—Richard A. Gaudet
*Assistant Examiner*—Lee S. Cohen
*Attorney, Agent, or Firm*—Theodore B. Roessel; Joseph C. MacKenzie

[57] ABSTRACT

A system including manometer, cuff, inflator, and stethoscope wherein the manometer has manually-operable "drop-off" pointers. Using the stethoscope, an observer operates the drop-off pointers in succession upon aurally detecting systole and diastole, respectively. The bleed of pressure from the cuff is regulated so that the cuff pressure drops according to a predetermined schedule. Manual operation of the drop-off pointers is caused to reduce the resistance to air flow from said cuff.

8 Claims, 2 Drawing Figures

BLOOD PRESSURE MEASURING SYSTEM

BACKGROUND OF THE INVENTION, FIELD OF THE INVENTION

The field of art to which the invention pertains is blood pressure measuring. In particular, pressure is applied to an artery to occlude it, and is then decreased just enough to slightly open the artery. At this latter point, the value of the pressure is ascertained and taken to be systolic pressure. The pressure applied to the artery is further decreased until it is just insufficient to occlude the artery to any degree whatsoever, and at this point, the value of pressure is ascertained and taken to be diastolic pressure. The basic problem of the art is to ascertain precisely when the artery is just not quite completely occluded, and just not occluded to any degree whatsoever, that is to say, to detect systole and diastole.

BACKGROUND OF THE INVENTION, DESCRIPTION OF THE PRIOR ART

In the prior art, the more common way of determining the patency of the artery, is to apply a stethoscope over the artery, with the occluded pressure being applied just upstream of the stethoscope. An observer, who listens with the stethoscope, and keeps his eye on a device which indicates continuously the pressure being applied to the artery, also controls the pressure applied to said artery, and estimates the values of the pressures obtaining at the two points in question. These pressures are, of course, the well-known systolic and diastolic pressures.

The above described technique is quite old, and has a number of shortcomings. To begin with, there is almost more for the observer to do than he can cope with adequately, even under favorable conditions. Thus, the observer is expected to simultaneously exercise aural acuity, visual acuity, manual dexterity, and coordinating ability, all at the same time. Obviously, laity are not likely to perform this technique very well. Even the professional and the expert have trouble in maintaining good performance, when required to repeat the technique too many times in too short a period of time. Again, observers have observational biases, so to speak. An important bias in blood pressure measuring is so-called "digit preference", which usually takes the form of there being more readings ending in zero, than is appropriate or plausible.

It has been proposed to make results less dependent upon the observer by making much or all of the technique automatic. However, the trained human ear and judgment cannot be equalled by any reasonable apparatus, in the detection of systole and diastole.

Exemplary prior art is to be found in the drawings and specifications of U.S. Pat. Nos., as follows:

| Levin | 1,532,705 |
| Ireland | 1,729,291 |
| Boucke | 2,811,964 |
| Hurley et al | 2,980,107 |
| Greenspan et al | 3,056,401 |
| Halpern | 3,104,661 |
| Halasz et al | 3,117,570 |
| Hay | 3,252,459 |
| Edwards | 3,480,005 |
| Greene, Jr. et al | 3,712,297 |

One object of the invention is to provide a blood pressure measuring system wherein substantially only aural acuity of the observer is needed to register and determine systolic pressure and diastolic pressure.

A second object of the invention is to provide a manually-operated blood pressure measuring system wherein manual dexterity, and visually acuity, and coordination thereof, are not needed for accurately registering and determining systolic pressure and diastolic pressure.

A third object of the invention is to provide a manually-operated blood pressure measuring system capable of use by a professional or expert or lay observer in making single or repetitive measurements easily and without inaccuracy.

A fourth object of the invention is to provide a manually-operated blood pressure measuring system having a pressurizable cuff, and a manometer wherein air is bled from said cuff in accordance with a predetermined schedule in response to determination of systolic pressure and diastolic pressure, and wherein said manometer is caused to register readings of systolic pressure values and diastolic pressure values, and wherein aural acuity is relied on to detect occurrence of systole and diastole.

Other objects of the invention will become apparent upon perusal of the description of the invention hereinbelow.

SUMMARY OF THE INVENTION

An humeral cuff (or other type of cuff or artery occluding means), a manometer, and an inflator are interconnected in the usual way. The cuff is placed on a subject and pumped up as usual, and then bled off while an observer, using a stethoscope, judges the occurrence of systole and diastole in dependence on the occurrence and disappearance of the well-known Korotkoff sounds. However, unlike the usual blood pressure measuring system of the observer controlled sort, the manometer has a couple of drop-off pointers which normally are driven by a pressure responsive element for indicating cuff pressure on a scale, but are coupled to the element in such fashion that the observer can uncouple each pointer, leaving such pointer stationary and indicating the value of cuff pressure obtaining at the moment of uncoupling. As the observer uncouples the pointers, the cuff is being bled automatically, preferably in accordance with a predetermined schedule. For example, as the observer will push a button, or something of that sort, in order to uncouple a pointer, that act is caused to regulate cuff pressure.

In short, an observer attending solely to what he hears with the stethoscope, "drops-off" pointers at the respective moments he thinks he has detected systole and diastole. Since the observer does not have to manipulate a bleed valve, and is not distracted by having to visually interpret and remember the pointer readings on the manometer scale, he can give full attention to the delicate task of aurally detecting the occurrence of systole and diastole.

BRIEF DESCRIPTION OF THE DRAWINGS

In FIG. 1, a blood pressure measuring system includes cuff 1, bleed device 2, and manometer 3, connected by tubes 4, 5 and 6, respectively, to tube 7. Tube 7 is in turn connected to one end of an inflator 8.

Figure 1:
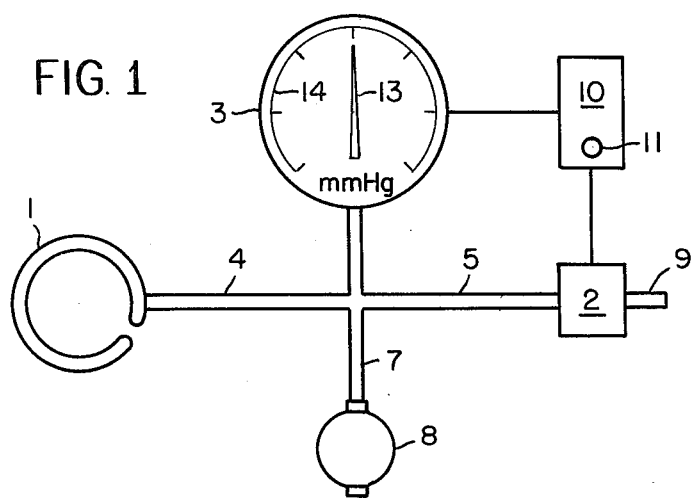
FIG. 1 is a diagram of a blood pressure measuring system according to the invention.

Typically, inflator 8 will take the form of the familiar rubber bulb which when squeezed will force air into the cuff 1.

In use, the cuff 1 is fastened about the humerus of a living subject, and inflator 8 is squeezed intermittently, until manometer 3 indicates that the air pressure inside the cuff is sufficiently high that the brachial artery is completely occluded.

Up to this point, bleed device 2 is to be supposed to be inoperative to release any air from the cuff. However, the blood pressure measuring system according to the invention also has a function controller 10 which, among other things, may act on device 2 to cause it to begin to bleed air out of the cuff, via tubes 4 and 5, and its exhaust 9, in response to pushing a push buttom 11 of function controller 10.

Figure 2:
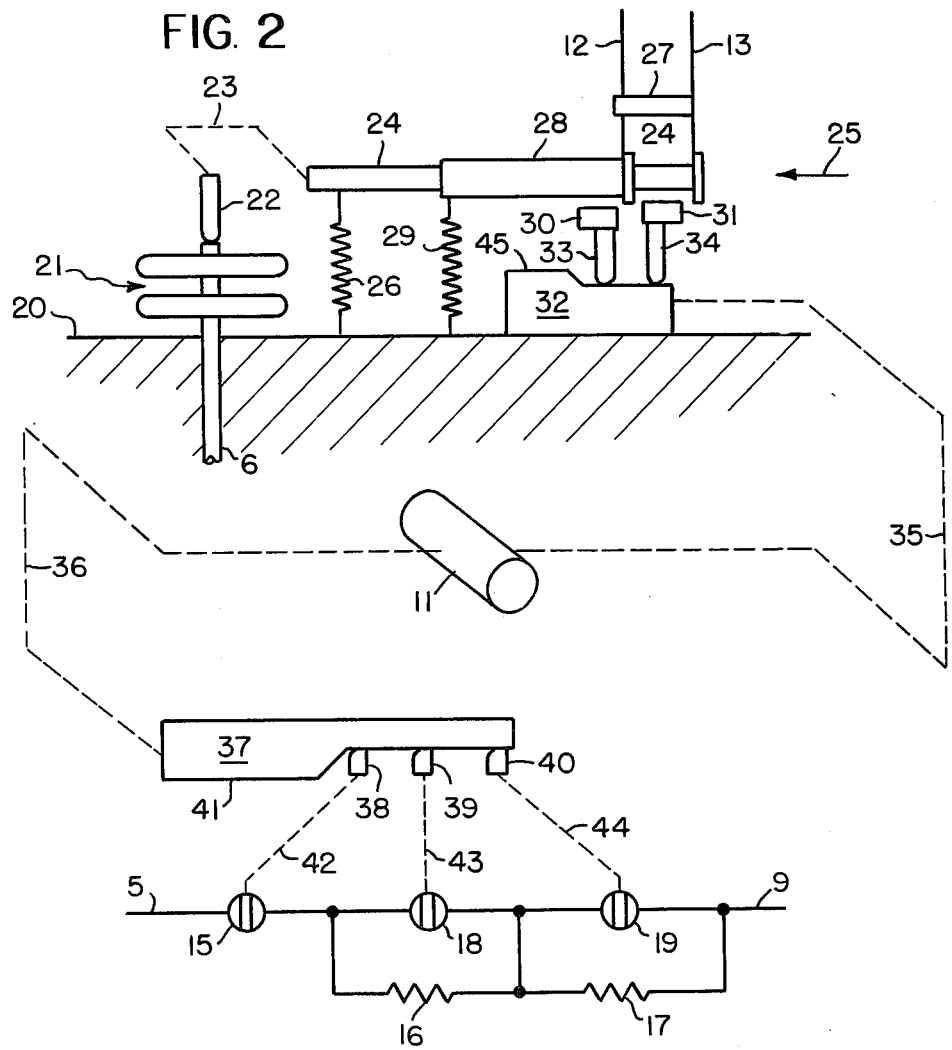
FIG. 2 illustrates specific forms which parts of the system may take.

While the air is bleeding from the cuff, an observer, as usual, has applied a stethoscope to the arm of the subject, and is listening for the Korotkoff sounds, which will tell him when the occluded artery just manages to open slightly, that is to say, systole occurs. At that instant, the manometer 3, which has pointers 12 (see FIG. 2) and 13 deflecting along a scale 14 calibrated in terms of pressure, will be sensing systolic pressure, and both said pointers will be pointing at the value of systolic pressure on said scale.

According to the invention, the observer, when he detects systole, immediately pushes the button 11, and this action causes the pointer 12 to be immobilized at the value it was indicating on scale 14 at the moment the button 11 was pushed. In this way, manometer 3 is caused to register the value of systolic pressure for further reference.

Preferably, the act of registering systolic pressure also results in changing the effect of bleed device 2 on the escape air from the cuff. The extent of change is desirably enough to approximate prior art practice, namely, the observer's more or less constant adjustment of bleed rate in order to make cuff pressure drop at about the rate of 3 or 4 mmHg per heart beat. As a rule of thumb, the amount of change should be enough so that, if effected at systole, the rate of pressure change will be at the desired value, at about diastole. The reason for changing the bleed effect in this fashion is to avoid distracting the observer by the need to manipulate the thumbscrew of a needle valve or other continuously variable fluid resistance.

In any event, the observer, after causing the manometer 3 to register the value of systolic pressure, continues to listen to the Korotkoff sounds, until they tell him (so to speak) that diastole has occurred, that is to say, the pressure in the cuff has become just less than the value required to just slightly occlude the brachial artery. When diastole occurs, the operator again pushes button 11. This push of the button results in pointer 13 becoming immobilized just like pointer 12, except that pointer 13 now registers the value of diastolic pressure. Further, this push of the button preferably dumps the remaining air in the cuff, i.e., changes the effect of bleed device 2 such as to allow cuff pressure to bleed down as fast as possible to the value of the ambient pressure of the environment of the blood pressure measuring system.

The expedient of dropping off pointers 12 and 13 at the systolic value and the diastolic value, respectively, and leaving them there to be read later, at the observer's convenience, obviously eliminates digit preference.

Further, the observer's hearing and judgement is concentrated solely upon the sound picked up by the stethoscope, and no other demands are made of his senses. Also, no action of him is required beyond pushing a button a few times.

Consequently, it becomes quite feasible to teach laity how to take blood pressure. In fact, the system according to the present invention makes it easy for the observer and subject to be the one and the same person. It goes without saying that, in this age of mass awareness of cardiovascular disease or malfunction, many are interested in taking their own blood pressure measurements. This not only satisfies their curiosity, but also allows medical expertise to devote itself more fully to less pedestrian applications thereof than blood pressure measurement.

Bleed device 2 may take various forms, each of which comes down to variable fluid resistance impeding air flow out of the cuff. Thus, in FIG. 2, the bleed device 2 may take the form of a valve 15 and fluid flow resistances 16 and 17, the latter having respective valves 18 and 19 in shunt.

Valve 15 represents, so to speak, infinite resistance presented to the air in the cuff while it is being inflated. With valve 15 open, however, resistances 16 and 17 together provide a relatively high resistance to flow such as will allow the pressure in the cuff to drop to systolic value at about the desired rate, and resistance 17 value represents a lesser value which, when cuff pressure drops to diastolic value, and with valves 15 and 18 open, will allow the cuff pressure to drop at about the desired rate. Finally, if all the valves are open, then the cuff pressure will bleed off at maximum rate. Harking back to FIG. 1, it is therefore evident that the first, second and third pushes of button 11 successively opened valves 15, 18 and 19.

The manometer 3 includes support and housing structure, which functionally provides base 20 for the operative elements of the manometer. Thus, a stack 21 of capsules is mounted on said base and connected to tube 6. Stack 21 responds to increasing pressure in the cuff by pushing a rod 22 connected by any suitable mechanism (indicated symbolically by dashed line 23) to a shaft 24 for rotating shaft 24 on its axis in clockwise direction (from a view along the axis of the shaft in the direction of arrow 25), such clockwise rotation being against the resistance of a symbolically-depicted return spring 26 interconnected between shaft 24 and base 20. Spring 26 exerts an initial bias on rod 22 such as to press the rod down against the stack 21 when the pressure therein is the same as on the outside thereof. With this type of arrangement, as cuff pressure increases, stack 21 forces the rod upward, but if cuff pressure then decreases, spring 26, via mechanism 23, forces the rod 22 to follow the stack down.

To shaft 24 is fixed pointer 13 having a lug 27 projecting therefrom across pointer 12. Pointer 12 is fixed to a sleeve 28 which journals it to shaft 24 for rotation with respect to shaft 24, unless restrained. A symbolically-depicted spring 29 interconnects base 20 and sleeve 28 for opposing clockwise rotation of pointer 12, and for biasing sleeve 28 such as to normally hold pointer 12 against lug 27.

It will be seen that when the cuff is fully deflated, the height of stack 21 will be at its normal minimum, spring 26 will be forcing the rod 22 lightly against the stack, and spring 29 will be forcing the pointer 12 lightly against the lug 27.

With this type of construction (which is old in the art), the pointers 12 and 13 can be dropped off by setting simple friction brakes or the like, provided the pressure in the stack 21 is on the decrease. For this purpose, brake shoes 30 and 31 of any suitable form are provided for operation by a cam 32 acting through follower 33 and 34 supporting the shoes for vertical motion into contact with sleeve 28 and shaft 24, respectively, for immobilizing same when the sleeves are forced against them by cam 32. Suitable mechanism for indexing cam 32 to the left is indicated by dashed line 35 interconnecting push button 11 and cam 32.

Preferably, similar index mechanism, indicated by dashed line 36, interconnects a cam 37 and push button 11. It will be observed that the function controller 10 in FIG. 1 corresponds essentially to the indexing mechanisms 35 and 36.

Cam 37 is rightwards movable to actuate the valves 15, 18 and 19 by means of cam followers 38, 39 and 40, connected to valves 15, 18, and 19 by suitable linkages represented by dashed lines 42, 43 and 44.

Indexing mechanisms are well-known in the art so we have not illustrated any in particular. However, it is to be noted that cam 32 has one less follower to operate than does cam 37, because starting the measuring cycle by opening valve 15 does not involve registration of the pressure value at that time. Accordingly, the actuating portions 41 and 45 of cams 37 and 32 are shown positioned such as to indicate that the indexing step for actuating follower 38 does not actuate the follower 34. It is also to be observed that the indexing mechanism could be of the cycling type wherein a fourth pushing of button 11 would restore the cams to their zero positions, namely, those shown in FIG. 2.

Various refinements and modifications of the present invention will be obvious to one skilled in the art. Thus, although it is contemplated herein that the power for actuating cams 32 will be supplied directly by the observer, such power could as well be supplied by electricity, in which case the indexing mechanisms essentially would be step motors energized by a momentary contact switch operated by the push button 11. Again, as will be evident from many of the patent specifications cited hereinabove, a variety of schemes for scheduling the resistance of bleed device 2 to flow of air from the cuff have been proposed heretofore, one or another of which could be used herein, in place of the valve and fixed fluid resistor scheme disclosed herein. Likewise, the "drop-off" technique is not per se essential to the present invention as it is but one form a manually immobilizable indicator arrangement may take.

Finally, although it would make things a little more complicated for the observer, he could operate the cams 32 and 37 directly and severally, thereby eliminating the indexing mechanisms 35 and 36.

Having described the invention in accordance with 35 USC 112, we claim:

1. A system for measuring blood pressure, said system having a pressurizable cuff for variably obstructing an artery, an inflator for pressurizing said cuff with fluid, a manometer for measuring the fluid pressure in said cuff, and bleed means having fluid resistance for bleeding said fluid out of said cuff via said fluid resistance, said system having means for connecting said inflator to said cuff, said manometer to said cuff, and said fluid resistance to said cuff;

said manometer havng an indicator immobilizable for indicating the value of said fluid pressure prevailing at the moment of immobilizing said indicator;

said system also having a controller means manually operable for immobilizing said indicator;

said system also having means for varying said fluid resistance such as to cause the fluid pressure in said cuff to decrease; and said controller means being operatively connected to said means for varying said fluid resistance, said controller means, when manually operated to immobilize said indicator, causing said means for varying said fluid resistance to vary said fluid resistance by a predetermined amount.

2. The system of claim 1, said manometer also having a second indicator immobilizable so as to indicate the value of said fluid pressure prevailing at the moment of immobilizing said second indicator;

said controller means also being manually operable to immobilize said second indicator;

said controller means, when manually operated to immobilize said second indicator, causing said means for varying said fluid resistance by a predetermined amount.

3. A system for measuring blood pressure, said system having a pressurizable cuff for variably obstructing an artery, an inflator for pressurizing said cuff with fluid, a manometer for measuring fluid pressure in said cuff, and bleed means having fluid resistance for bleeding said fluid out of said cuff via said fluid resistance, said system having means for connecting said inflator to said cuff, said manometer to said cuff, and said fluid resistance to said cuff;

said manometer having an indicator immobilizable for indicating the value of said fluid pressure prevailing at the moment of immobilizing said indicator;

said system also having a controller means manually operable for immobilizing said indicator;

said system also having means for varying said fluid resistance such as to cause the fluid pressure to said cuff to decrease according to a predetermined schedule; and said controller means being operatively connected to said means for varying said fluid resistance, said controller means, when manually operated to immobilize said indicator, causing said means for varying said fluid resistance to vary said fluid resistance by a predetermined amount in accordance with said schedule.

4. The system of claim 3, said manometer also having a second indicator immobilizable so as to indicate the value of said fluid pressure prevailing at the moment of immobilizing said second indicator;

said controller means also being manually operable to immobilize said second indicator;

said controller means, when manually operated to immobilize said second indicator, causing said means for varying said fluid resistance to vary said fluid resistance by a predetermined amount in accordance with said schedule.

5. A system for measuring blood pressure, said system having a pressurizable cuff for variably obstructing an artery, an inflator for pressurizing said cuff with fluid, a manometer for measuring the fluid pressure in said cuff, and bleed means having fluid resistance for bleeding said fluid out of said cuff via said fluid resistance, said system having means for connecting said inflator to said cuff, said manometer of said cuff and said fluid resistance to said cuff;

said manometer having an indicator immobilizable for indicating the value of said fluid pressure prevailing at the moment of immobilizing said indicator;

said system also having a controller means manually operable for immobilizing said indicator;

said fluid resistance being in the form of a plurality of fluid resistors of fixed values, there being bleed-operating means connected to said resistors, said bleed-operating means being connected to said controller means for operation by said controller means, when said controller means is operated to immobilize said indicator, for connecting certain of said fluid resistors to said cuff for bleeding said fluid therethrough and out of said cuff at the same time said indicator is immobilized.

6. The system of claim 5, said manometer also having a second indicator immobilizable so as to indicate the value of said fluid pressure prevailing at the moment of immobilizing said second indicator;

said controller means also being manually operable to immobilize said second indicator and, when so operated, to connect other of said resistors to said cuff for bleeding said fluid therethrough and out of said cuff.

7. A system for measuring blood pressure, said system having a pressuriziable cuff for variably obstructing an artery, an inflator for pressurizing said cuff with fluid, a manometer for measuring the fluid pressure in said cuff, and bleed means having fluid resistance for bleeding said fluid out of said cuff via said fluid resistance, said system having means for connecting said inflator to said cuff, said manometer to said cuff, said fluid resistance to said cuff;

said manometer having an indicator immobilizable for indicating the value of said fluid pressure prevailing at the moment of immobilizing said indicator;

said manometer having motive means for moving said indicator in response to said fluid pressure for indicating said fluid pressure;

said manometer having immobilizing means actuable for immobilizing said indicator;

said system also having a controller means manually operable for actuating said immobilizing means;

said system also having means for varying said fluid resistance such as to cause the fluid pressure in said cuff to decrease; and said controller means being operatively connected to said means for varying said fluid resistance, and said controller means, when manually operated for actuating said immobilizing means, also causing said means for varying said fluid resistance to vary said fluid resistance by a predetermined amount.

8. The system of claim 7, said manometer also having a second indicator immobilizable so as to indicate the value of said fluid pressure prevailing at the moment of immobilizing said second indicator;

said manometer having motive means for moving said second indicator in response to said fluid pressure for indicating said fluid pressure;

said manometer having second immobilizing means actuable for immobilizing said second indicator;

said controller means also being manually operable for actuating said second immobilizing means;

said controller means, when manually operated for actuating said second immobilizing means, also causing said means for varying said fluid resistance to vary said fluid resistance by a predetermined amount.

* * * * *